(12) United States Patent
Yun (10) Patent No.: US 8,212,964 B2
(45) Date of Patent: Jul. 3, 2012

(54) BACKLIGHT UNIT AND LIQUID CRYSTAL DISPLAY MODULE INCLUDING THE SAME

(75) Inventor: Seong-Hyun Yun, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 517 days.

(21) Appl. No.: 12/338,804

(22) Filed: Dec. 18, 2008

(65) Prior Publication Data

US 2009/0262281 A1 Oct. 22, 2009

(30) Foreign Application Priority Data

Apr. 16, 2008 (KR) ........................ 10-2008-0035057

(51) Int. Cl.
*G02F 1/1335* (2006.01)
(52) U.S. Cl. .......................................... 349/64; 349/62
(58) Field of Classification Search .................. None
See application file for complete search history.

(56) References Cited

U.S. PATENT DOCUMENTS

| 5,119,204 A | * | 6/1992 | Hashimoto et al. | 348/794 |
| 5,467,208 A | * | 11/1995 | Kokawa et al. | 349/67 |
| 7,072,096 B2 | * | 7/2006 | Holman et al. | 359/298 |
| 2006/0164568 A1 | | 7/2006 | Paek et al. | |
| 2007/0008738 A1 | | 1/2007 | Han et al. | |
| 2008/0111948 A1 | * | 5/2008 | Epstein et al. | 349/64 |

FOREIGN PATENT DOCUMENTS

| CN | 1969202 | 5/2007 |
| KR | 10-2006-0078871 | 7/2006 |
| KR | 10-2007-0106397 | 11/2007 |
| WO | 2007/040199 A1 | 4/2007 |

OTHER PUBLICATIONS

Office Action issued in corresponding Chinese Patent Application No. 200810184682.0; issued Aug. 13, 2010.
Office Action issued in corresponding Chinese Patent Application No. 200810184682.0, mailed Aug. 25, 2011.

* cited by examiner

*Primary Examiner* — Lucy Chien
(74) *Attorney, Agent, or Firm* — Brinks Hofer Gilson & Lione (57) ABSTRACT

A backlight unit includes a reflection sheet, lamps arranged over the reflection sheet and with a first distance between adjacent lamps, a first diffuser plate disposed over the lamps and spaced apart from the reflection sheet with a second distance, the first diffuser plate having a first surface facing the reflection sheet and a second surface opposite to the first surface, wherein the first surface is flat and the second surface includes first patterns, and a second diffuser plate disposed over the first diffuser plate, the diffuser plate having a third surface facing the first diffuser plate and a fourth surface opposite to the third surface, wherein the third surface is flat and the second surface includes second patterns, wherein a ratio of the first distance over the second distance is within a range of more than 0 and less than and/or equal to 2.75.

18 Claims, 11 Drawing Sheets

FIG. 1

Related Art

FIG. 2

Related Art

FIG. 3

Related Art

FIG. 4

Related Art

FIG. 5

Related Art

FIG. 6

Related Art

BACKLIGHT UNIT AND LIQUID CRYSTAL DISPLAY MODULE INCLUDING THE SAME

RELATED APPLICATIONS

This application claims the benefit of Korean Patent Application No. 10-2008-0035057 filed in Korea on Apr. 16, 2008, which is hereby incorporated by reference for all purposes as if fully set forth herein.

BACKGROUND

1. Field of the Invention

The disclosure relates to a liquid crystal display device, and more particularly, to a backlight unit and a liquid crystal display module including the same.

2. Discussion of the Related Art

Recently, various flat panel display (FPD) devices having advantages of thin thicknesses, light weights and low power consumption have been developed and have replaced cathode ray tubes (CRTs). The FPD devices include plasma display panels (PDPs), liquid crystal display (LCD) devices, electroluminescent display (ELD) device, and so on.

PDPs display images by colliding ultraviolet rays emitted from gases contained between upper and lower substrates, for example, xenon (Xe) and neon (Ne), with a phosphor and emitting visible rays, that is, by emission of the phosphor due to violet rays produced in the discharge of gas. LCD devices display images by controlling transmittance of light emitted from a backlight unit and passing through pixels according to an electric field, which is induced in a liquid crystal layer injected between upper and lower substrates and is changed by signal voltages of the pixels. ELD devices display images by interposing an organic light-emitting material between an anode electrode and a cathode electrode and enabling organic molecules to emit light using currents.

Among the display devices, LCD devices are widely used because the LCD devices are excellent at displaying moving images and have a high contrast ratio.

Generally, an LCD device uses optical anisotropy and polarization properties of liquid crystal molecules. The liquid crystal molecules have a definite alignment direction as a result of their thin and long shapes. The alignment direction of the liquid crystal molecules can be controlled by applying an electric field across the liquid crystal molecules. In other words, as the intensity or direction of the electric field is changed, the alignment of the liquid crystal molecules also changes. Since incident light is refracted based on the orientation of the liquid crystal molecules due to the optical anisotropy of the liquid crystal molecules, images can be displayed by controlling light transmittance.

LCD devices are not self-luminescent and require an additional light source. By disposing a backlight unit at the rear side of a liquid crystal panel to emit light into the liquid crystal panel, discernible images can be displayed.

Backlight units are classified as edge type or direct type according to the position of the light source with respect to a display panel. In edge-type backlight units, which may be referred to as side-type, one or a pair of lamps are disposed at one side or at each of two sides of a light guide panel of a backlight unit. The edge-type backlight units have an advantage of easy manufacture. In direct-type backlight units, a plurality of lamps are disposed directly under a diffuser plate and provide light to a liquid crystal panel. The direct-type backlight units are widely used for large-sized LCD devices because of high uniformity of light.

Recently, large-sized display devices having more than 20 inches in diameter have been highly requested, and the direct-type backlight units are used for the large-sized display devices because the direct-type backlight units have high efficiency of light due to a plurality of lamps and have no limitation on sizes by considering the brightness and the contrast ratio of the device.

Meanwhile, the liquid crystal panel and the backlight unit are assembled as a module with various mechanical elements to protect them from outer impacts prevent light from leaking, and this may be referred to as a liquid crystal display module.

Figure 1:
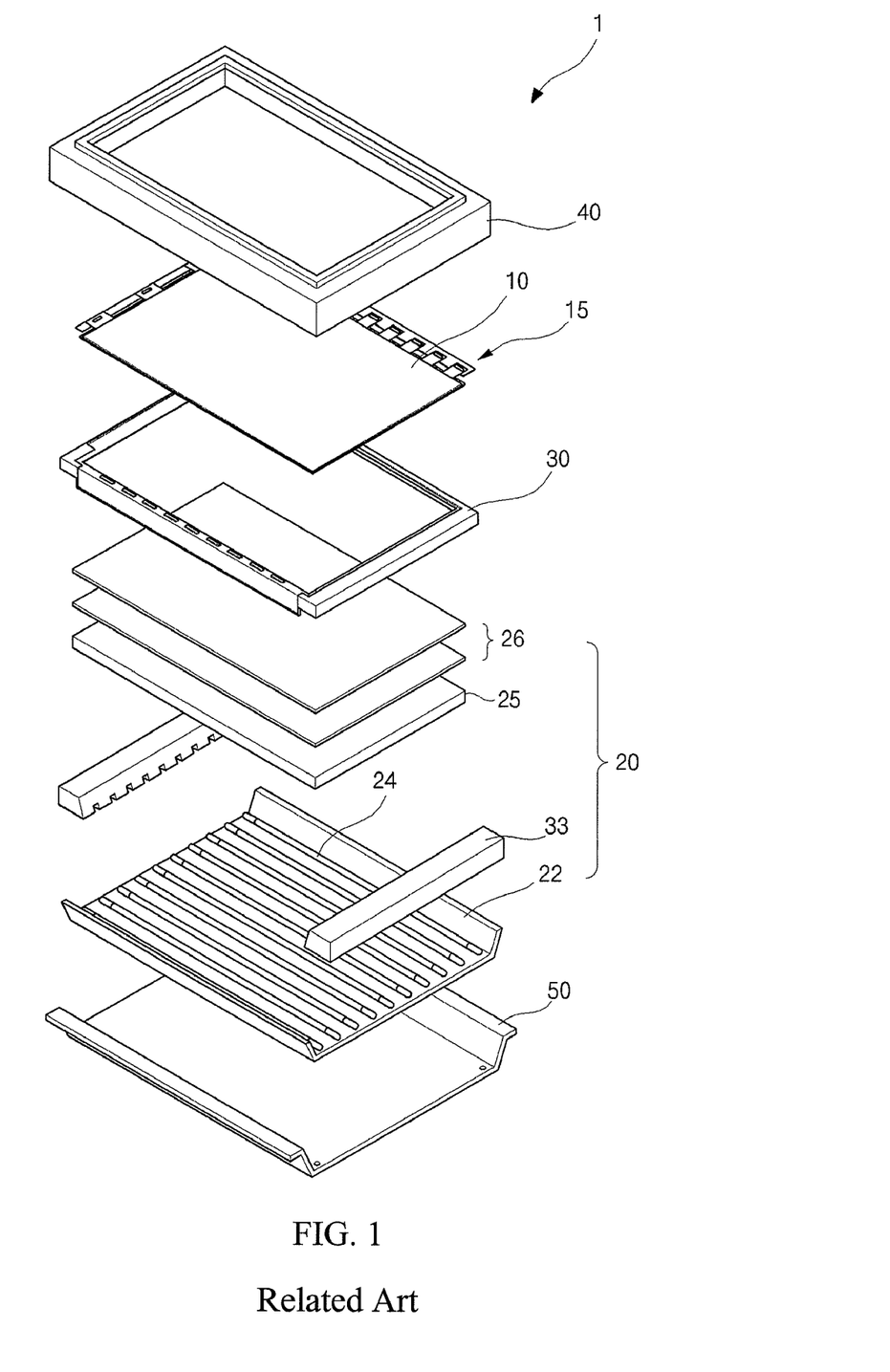
FIG. 1 is an exploded perspective view illustrating a liquid crystal display (LCD) module including a direct-type backlight unit according to the related art.

FIG. 1 is an exploded perspective view illustrating a liquid crystal display (LCD) module including a direct-type backlight unit according to the related art. In FIG. 1, the related art LCD module 1 includes a liquid crystal panel 10, a backlight unit 20, a support main 30, a top case 40 and a cover bottom 50.

The liquid crystal panel 10 includes upper and lower substrates (not shown) and a liquid crystal layer (not shown) between the upper and lower substrates. Thin film transistors (not shown) are formed on the lower substrate, and color filters (not shown) are formed on the upper substrate. Images are displayed according to on/off states of the thin film transistors. In addition, gate and data printed circuit boards 15 are connected to the liquid crystal panel 10 and supply scan signals and data signals to the liquid crystal panel 10, respectively.

The direct-type backlight unit 20 is disposed at a rear surface of the liquid crystal panel 10 and provides the liquid crystal panel 10 with light. The backlight unit 20 includes a plurality of lamps 24 spaced apart from each other. A reflection sheet 22 is disposed under the plurality of lamps 24. A couple of support sides 33 are combined with respective sides of each lamp 24 to support the plurality of lamps 24. A diffuser plate 25 and a plurality of optical sheets 26 are disposed over the plurality of lamps 24. The diffuser plate 25 includes a plurality of beads therein.

The liquid crystal panel 10 and the backlight unit 20 are disposed on the support main 30. The support main 30 prevents the liquid crystal panel 10 and the backlight unit 20 from moving and supports the liquid crystal panel 10 and the backlight unit 20.

The top case 40 covers edges of an upper surface of the liquid crystal panel 10 and side surfaces of the support main 30 to support and protect the edges of the liquid crystal panel 10 and the side surfaces of the support main 30.

The cover bottom 50 covers a lower surface of the support main 30 and protects lower elements of the LCD module 1. The cover bottom 50 is combined with the support main 30 and the top case 40 by a connecting means (not shown) to become a module.

Figure 2:
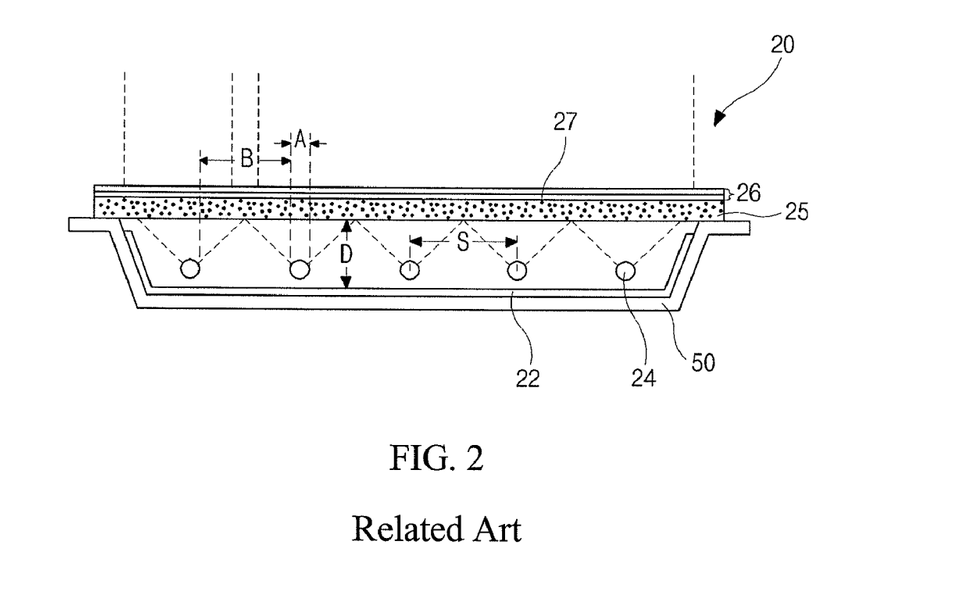
FIG. 2 is a cross-sectional view expanding a part of an LCD module including a direct-type backlight unit according to the related art.
Figure 3:
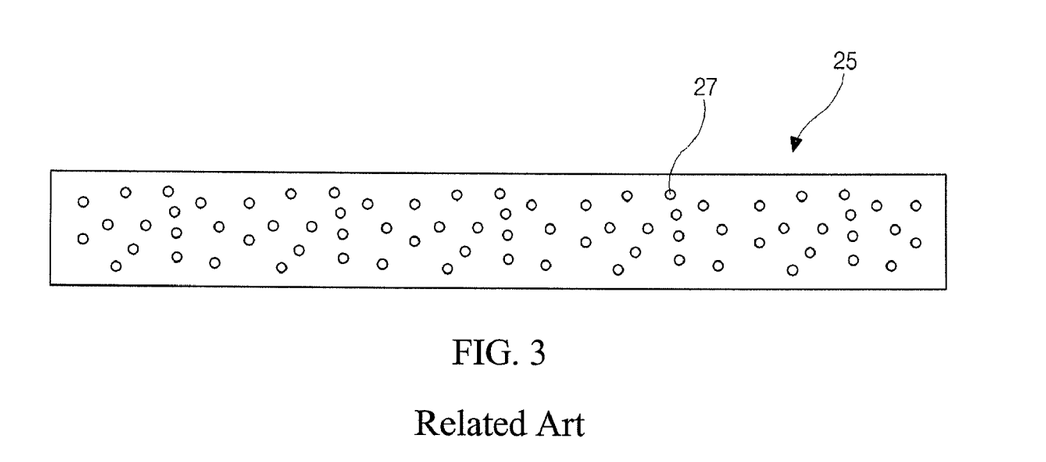
FIG. 3 is a cross-sectional view illustrating a diffuser plate of a direct-type backlight unit according to the related art.

FIG. 2 is a cross-sectional view expanding a part of an LCD module including a direct-type backlight unit according to the related art. FIG. 3 is a cross-sectional view illustrating a diffuser plate of a direct-type backlight unit according to the related art.

In FIG. 2, the direct-type backlight unit 20 of the related art LCD module includes a reflection sheet 22, a plurality of lamps 24, a diffuser plate 25 and a plurality of optical sheets 26. The reflection sheet 22 is disposed on a cover bottom 50. The plurality of lamps 24 are disposed over the reflection sheet 22 and spaced apart from each other with a first distance S. The diffuser plate 25 is disposed over the plurality of lamps 24 with a second distance D from an upper surface of the cover bottom 50, more particularly, from a surface of the reflection sheet 22. Referring to FIG. 3, the diffuser plate 25 has flat upper and lower surfaces and includes a plurality of beads 27, which are spherically shaped and are randomly distributed. Accordingly, when lights from the plurality of lamps 24 are incident on the diffuser plate 25, paths of the lights are changed by the beads 27, and the lights are diffused.

However, even though the diffuser plate 25 is used, there may exist a brightness difference between first regions A corresponding to the lamps 24 and second regions B corresponding to portions between adjacent lamps 24 if a distance between adjacent lamps 24 is increased more than the diffusing ability of the diffuser plate 25. The brightness difference causes mura defects on displayed images. To prevent this, the plurality of lamps 24 are arranged with the predetermined distance S, and the diffuser plate 25 is disposed over the lamps 24 with the predetermined second distance D from the reflection sheet 22, thereby diffusing lights and averaging the bright distribution. At this time, the ratio of the first distance S between adjacent lamps 24 and the second distance D between the reflection sheet 22 and the diffuser plate 25, that is, a value of the first distance S over the second distance D, which may be referred to as a distance ratio S/D, is a very important factor for preventing the mura defects due to the brightness difference.

Generally, in case that one diffuser plate 25 including the plurality of beads 27 randomly diffused therein is disposed over the lamps 24 as stated above, there is no mura defect due to the brightness difference if the diffuser plate 25 and the lamps 24 are arranged such that the distance ratio S/D equals to or is less than 1.35.

Figure 4:
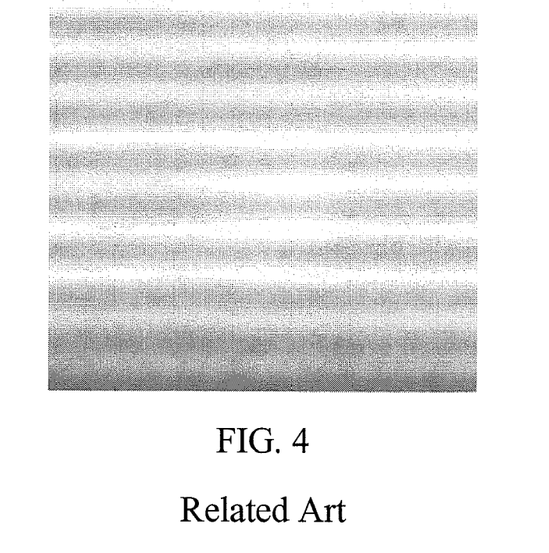
FIG. 4 is a photo showing a white image displayed in the related art LCD module including lamps and a diffuser plate that are arranged with the distance ratio S/D within a range of 1.35 to 2.75.

However, in the related art LCD module, when the lamps 24 and the diffuser plate 25 are arranged such that the distance ratio S/D is within a range of 1.35 to 2.75, there occur mura defects in which line-shaped dark portions are periodically shown due to the brightness difference as shown in FIG. 4. FIG. 4 is a photo showing a white image displayed in the related art LCD module including lamps and a diffuser plate that are arranged with the distance ratio S/D within a range of 1.35 to 2.75.

Figure 5:
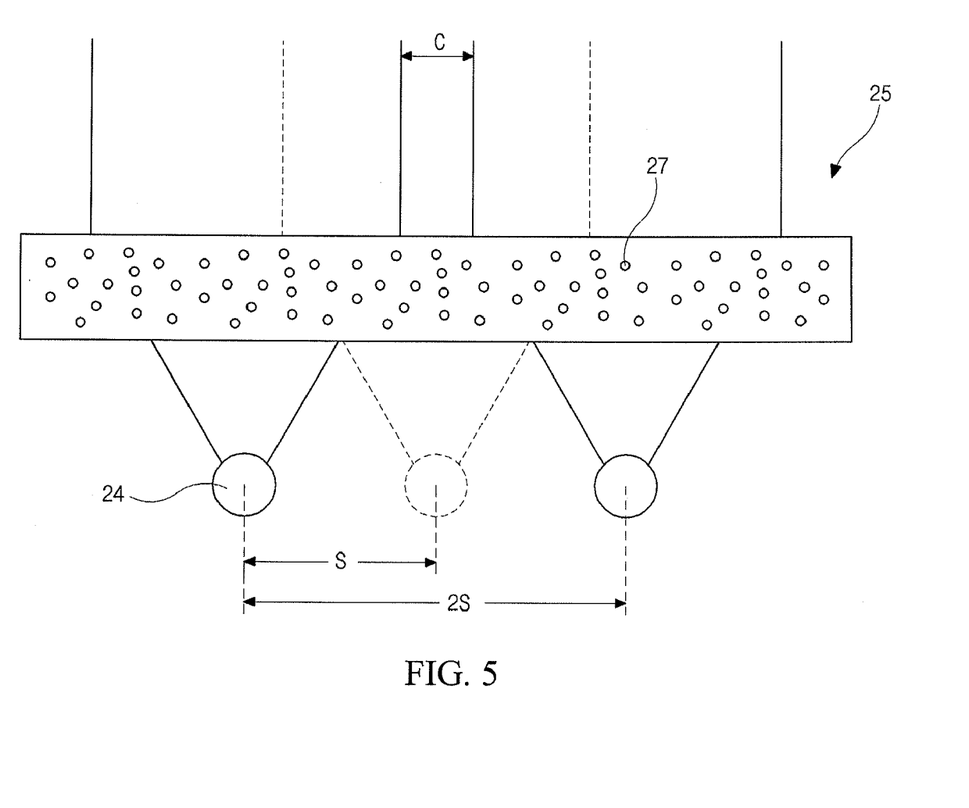
FIG. 5 is a view of illustrating a part of an LCD module according to another embodiment of the related art and shows a diffuser plate and lamps.
Figure 6:
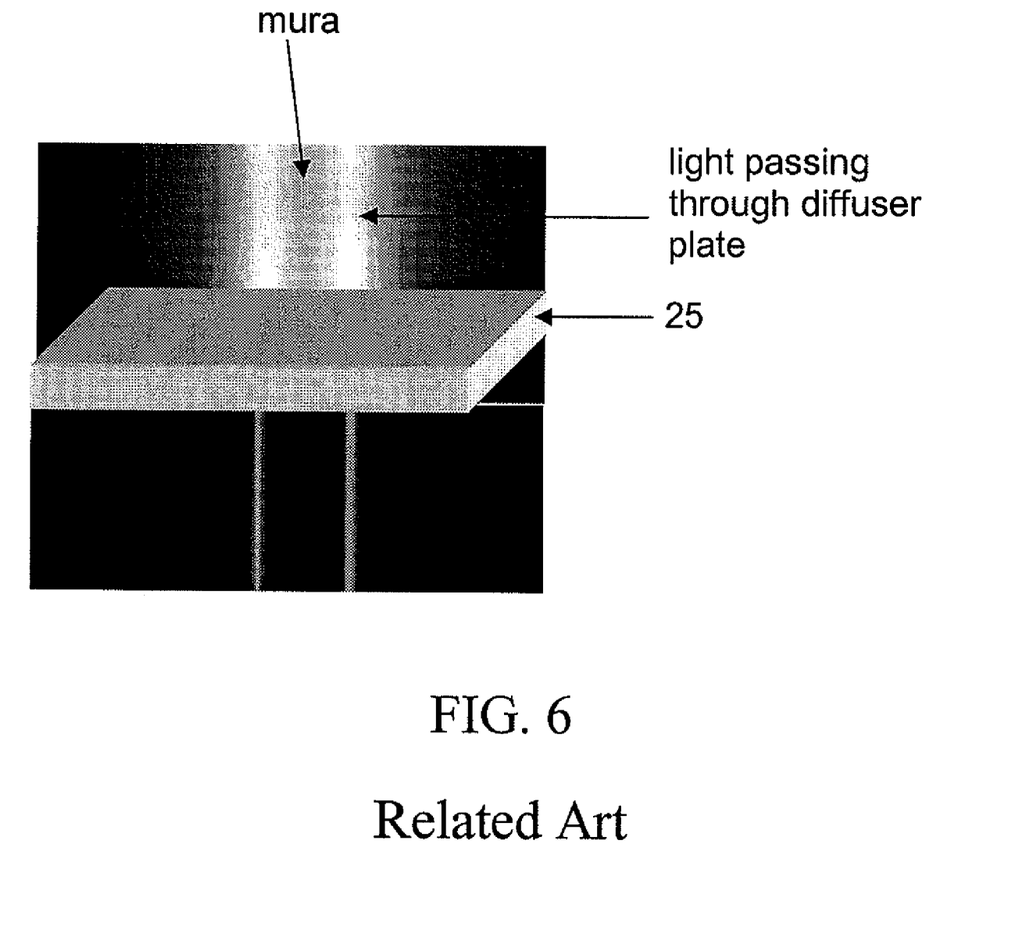
FIG. 6 is a view showing status of lights passing through the diffuser plate from the lamps.

FIG. 5 is a view of illustrating a part of an LCD module according to another embodiment of the related art and shows a diffuser plate and lamps. FIG. 6 is a view showing status of lights passing through the diffuser plate from the lamps. Here, a distance between adjacent lamps is widened as compared with that of FIG. 2.

In FIGS. 5 and 6, to reduce manufacturing costs, the number of lamps 24 is decreased, and the first distance between adjacent lamps is increased and becomes 2S. The first distance of FIG. 5 is twice wider than the first distance S of FIG. 2. At this time, lights emitted from the lamps 24 have different paths in reaching the diffuser plate 24, and there are regions C in which the brightness is rapidly lowered due to path difference. Accordingly, this causes brightness difference, and mura defects occur because the path difference is beyond the diffusing ability of the diffuser plate 25.

Meanwhile, if a thickness or height of the cover bottom 50 is reduced to manufacture a thin device, the second distance D between the reflection sheet 22 and the diffuser plate 25 is decreased. Accordingly, the distance ratio is larger than 1.35, and thus there occur mura defects.

BRIEF SUMMARY

A backlight unit includes a reflection sheet, lamps arranged over the reflection sheet and with a first distance between adjacent lamps, a first diffuser plate disposed over the lamps and spaced apart from the reflection sheet with a second distance, the first diffuser plate having a first surface facing the reflection sheet and a second surface opposite to the first surface, wherein the first surface is flat and the second surface includes first patterns, and a second diffuser plate disposed over the first diffuser plate, the diffuser plate having a third surface facing the first diffuser plate and a fourth surface opposite to the third surface, wherein the third surface is flat and the second surface includes second patterns, wherein a ratio of the first distance over the second distance is within a range of more than 0 and less than and/or equal to 2.75.

In another aspect, a liquid crystal display device includes a backlight unit including a reflection sheet, lamps arranged over the reflection sheet and with a first distance between adjacent lamps, a first diffuser plate disposed over the lamps and spaced apart from the reflection sheet with a second distance, the first diffuser plate having a first surface facing the reflection sheet and a second surface opposite to the first surface, wherein the first surface is flat and the second surface includes first patterns, and a second diffuser plate disposed over the first diffuser plate, the diffuser plate having a third surface facing the first diffuser plate and a fourth surface opposite to the third surface, wherein the third surface is flat and the second surface includes second patterns, a liquid crystal panel over the backlight unit, a support main under the liquid crystal panel and over the backlight unit, and a top case covering edges of an upper surface of the liquid crystal panel and side surfaces of the support main, wherein a ratio of the first distance over the second distance is within a range of more than 0 and less than and/or equal to 2.75.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE DRAWINGS AND THE PRESENTLY PREFERRED EMBODIMENTS

Reference will now be made in detail to embodiments of the present invention, examples of which are illustrated in the accompanying drawings.

Figure 7:
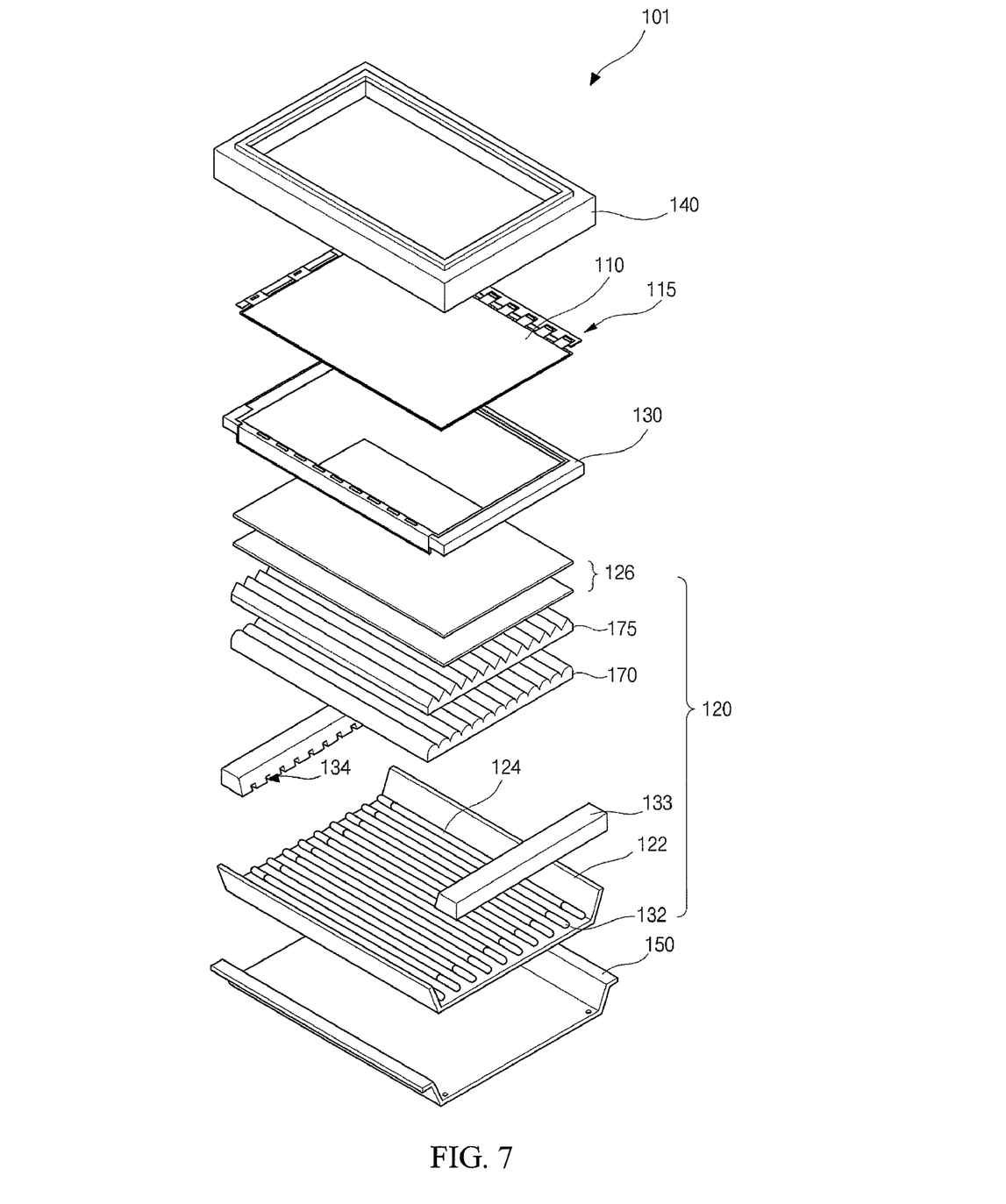
FIG. 7 is an exploded perspective view illustrating a liquid crystal display (LCD) module according to an exemplary embodiment of the present invention.

FIG. 7 is an exploded perspective view illustrating a liquid crystal display (LCD) module according to an exemplary embodiment of the present invention.

In FIG. 7, the LCD module 101 according to the exemplary embodiment of the present invention includes a liquid crystal panel 110, a backlight unit 120, a support main 130, a top case 140 and a cover bottom 150.

The liquid crystal panel 110 includes upper and lower substrates (not shown) spaced apart from each other and a liquid crystal layer (not shown) between the upper and lower substrates. Gate and data lines (not shown), thin film transistors (not shown) and pixel electrodes are formed on the lower substrate. The gate and data lines cross each other to define pixel regions. The thin film transistors are connected to the gate and data lines. The pixel regions are connected to the thin film transistor and disposed in the pixel regions. Color filters (not shown) and a common electrode are formed on the upper substrate. Liquid crystal molecules of the liquid crystal layer are driven by electric fields induced between the pixel electrodes and the common electrode according to on/off states of the thin film transistors, and images are displayed. The liquid crystal panel 10 is connected to gate and data printed circuit boards 115 supplying scan signals and data signals to the liquid crystal panel 10, respectively.

The backlight unit 120 is disposed at a rear surface of the liquid crystal panel 110 and provides the liquid crystal panel 110 with light. The backlight unit 120 includes a plurality of lamps 124 spaced apart from each other over the cover bottom 150. A reflection sheet 122 is disposed between the plurality of lamps 124 and the cover bottom 150. A couple of support sides 133 cover respective ends of each lamp 124. Each of the support sides 133 has openings 134 at an inner side thereof, and the ends of each lamp 124 pass through the openings 134. A first diffuser plate 170 and a second diffuser plate 175 are sequentially disposed over the plurality of lamps 124. A plurality of optical sheets 126 are disposed over the second diffuser plate 175. The backlight unit 120 is a direct-type in which lamps are disposed directly under a liquid crystal panel.

The liquid crystal panel 110 and the backlight unit 120 are disposed on the support main 130. The support main 130 prevents the liquid crystal panel 110 and the backlight unit 120 from moving and supports the liquid crystal panel 110 and the backlight unit 120.

The top case 140 covers edges of an upper surface of the liquid crystal panel 110 and side surfaces of the support main 130 to support and protect the edges of the liquid crystal panel 110 and the side surfaces of the support main 130.

The cover bottom 150 covers a lower surface of the support main 130 and protects lower elements of the LCD module 101. The cover bottom 150 is combined with the support main 130 and the top case 140 by a connecting means (not shown) to become a module.

Meanwhile, even though shown in the figures, an inverter unit for providing power source to the lamps 124 is located under the cover bottom 150, and a cover shield is included to protect the inverter unit. The cover bottom 150 and the cover shield wrap the inverter unit and protect the inverter unit from outer impacts. The cover bottom 150 and the cover shield may be made of a metallic material and may screen electric waves generated from the inverter unit.

Figure 8:
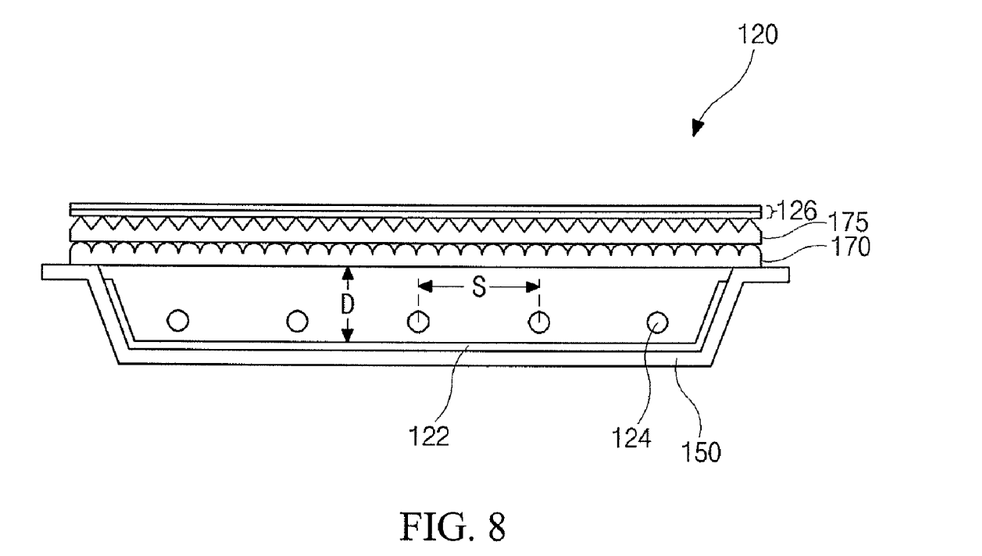
FIG. 8 is a cross-sectional view expanding a part of an LCD module according to an exemplary embodiment of the present invention.

FIG. 8 is a cross-sectional view expanding a part of an LCD module according to an exemplary embodiment of the present invention and shows a backlight unit and a cover bottom.

As shown in FIG. 8, in the LCD module according to the present invention, the backlight unit 120 includes a reflection sheet 122, a plurality of lamps 124, a first diffuser plate 170, a second diffuser plate 175, and a plurality of optical sheets 126 arranged in order. More particularly, the reflection sheet 122 is disposed on a cover bottom 150. The plurality of lamps 124 are disposed over the reflection sheet 122 and spaced apart from each other with a first distance S therebetween. The first diffuser plate 170 is disposed over the plurality of lamps 124 with a second distance D from the reflection sheet 122. The second diffuser plate 175 is disposed on the first diffuser plate 170, and the plurality of optical sheets 126 are disposed on the second diffuser plate 175. Here, the first and second diffuser plates 170 and 175 have different functions.

Figure 9A:
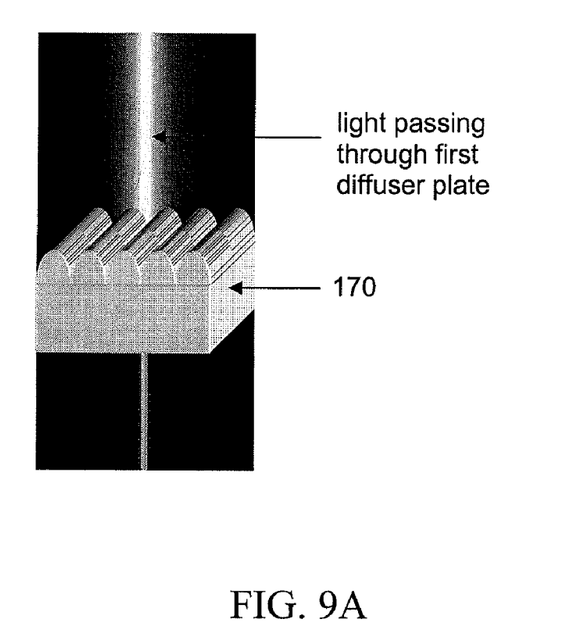
FIG. 9A is a view showing status of light passing through a first diffuser plate according to the present invention.
Figure 9B:
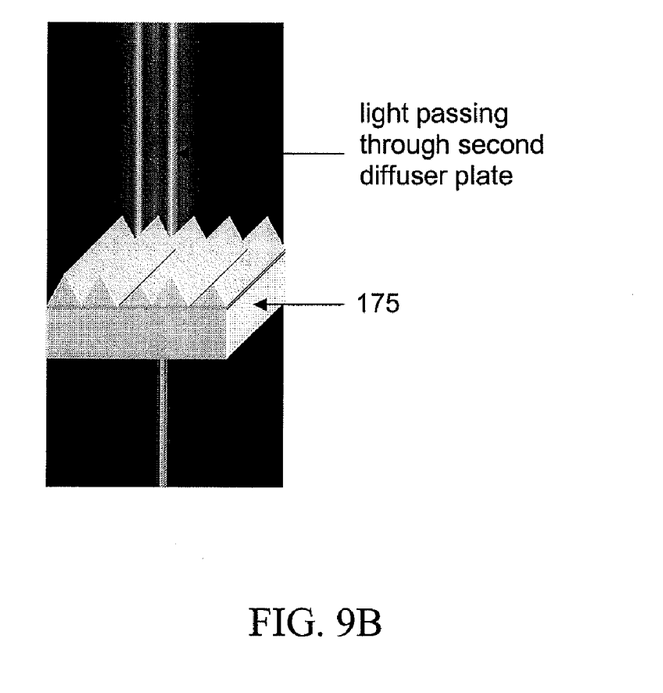
FIG. 9B is a view showing status of light passing through a second diffuser plate according to the present invention.

FIG. 9A is a view showing status of light passing through a first diffuser plate according to the present invention, and FIG. 9B is a view showing status of light passing through a second diffuser plate according to the present invention.

In FIG. 9A, the first diffuser plate 170 includes a plurality of first patterns and control a stretching range of the quantity of light and brightness in a position corresponding to each lamp 124 of FIG. 8 according to pattern shapes, sizes and transmittance-controlling functions. That is, the first diffuser plate 170 allows light passing therethrough to be diffused into an area wider than a diameter of the lamp 124 of FIG. 8 such that brightness is similar to the brightness of the lamp 124 and is uniform in the area. Here, when it is assumed that the second distance D from the reflection sheet 122 to the first diffuser plate 170 is the same as the second distance D in the related art and that a width of the light diffused by the related art diffuser plate, which includes the beads therein, and disposed within uniform brightness is defined as 1, a width of the area has a value larger than 1 and less than 1.5. In other words, the first diffuser plate 170 has a diffusing ability which is maximized at about 1.5 times larger than the related art diffuser plate.

Figure 10A:
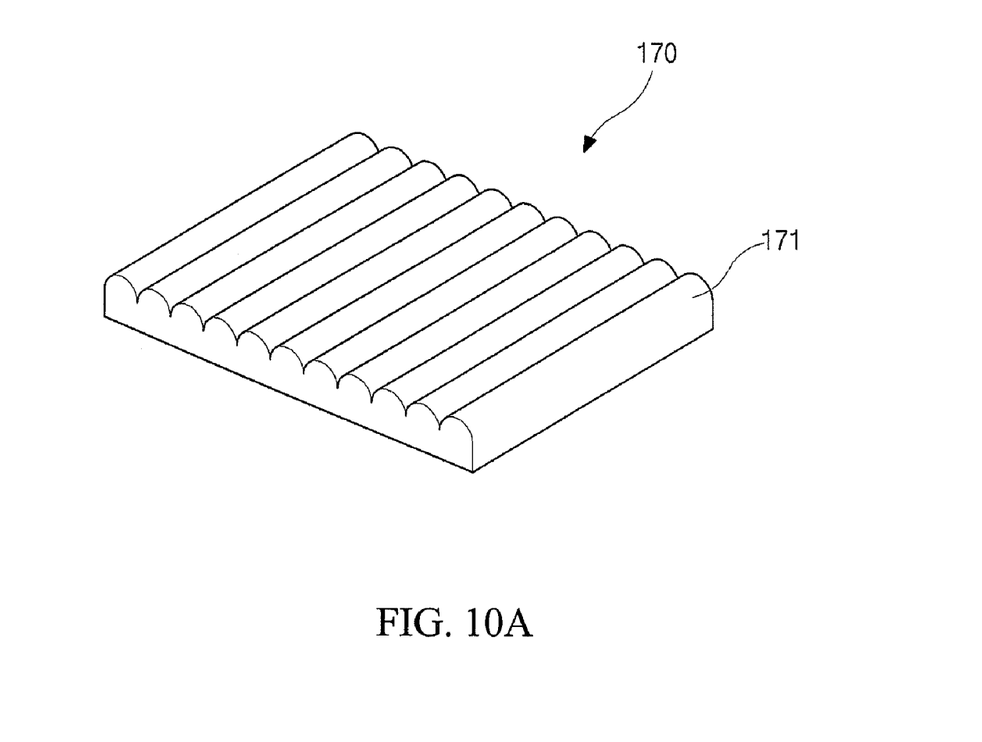
FIGS. 10A and 10B are perspective views illustrating various patterns of a first diffuser plate according to the present invention.
Figure 10B:
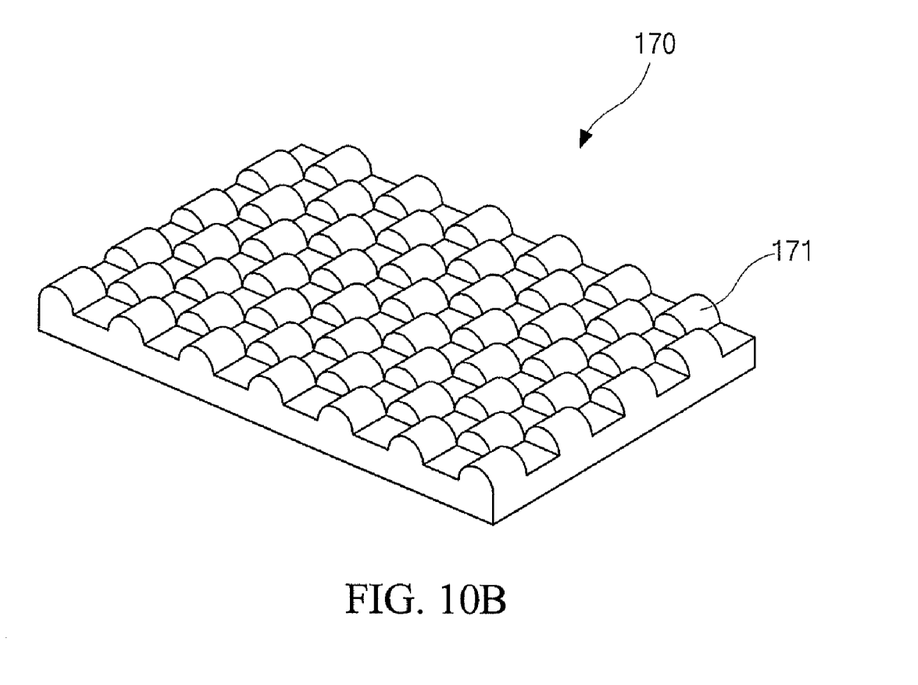

FIGS. 10A and 10B are perspective views illustrating various patterns of a first diffuser plate according to the present invention.

In FIGS. 10A and 10B, the first diffuser plate 170 has a first surface facing the lamps 124 of FIG. 7 and the reflection sheet 122 of FIG. 7 and a second surface opposite to the first surface and facing the liquid crystal panel 110 of FIG. 7. The first surface of the first diffuser plate 170 is flat, and the second surface of the first diffuser plate 170 includes uneven first patterns 171. The first patterns 171 each may have a lenticular lens shape, which has a cross-section of a semicircle, and is disposed parallel to the lamps 124. The first patterns 171 may have a long bar shape having a length corresponding to the lamps 124 and extending along a first direction parallel to the lamps 124 as shown in FIG. 10A. Alternatively, the first patterns 171 may be spaced apart from each other along the first direction and a second direction perpendicular to the lamps 124 as shown in FIG. 10B.

The first patterns 171, beneficially, may have a pitch within a range of 50 μm to 500 μm and a height within a range of 20 μm to 400 μm. The first patterns 171 may be arranged with the regular pitch, and the first patterns 171 may be irregularly, that is, randomly disposed. In addition, the first patterns 171 may have different heights within the range of 20 μm to 400 μm.

The first diffuser plate 170 may be formed of one of PMMA (polymethyl methacrylate), PS (polystyrene), PC (polycarbonate), COC (cyclo-olefin copolymers), PET (polyethylene terephthalate), PBT (polybutylene terephtalate) and plastic alloys. It is desirable that the first diffuser plate 170 including the first patterns 171 has a thickness of 0.6 mm to 3 mm.

Referring to FIG. 9B, the second diffuser plate 175 includes a plurality of second patterns and control a range of a lamp image and brightness according to pattern shapes, sizes and transmittance-controlling functions. That is, the second diffuser plate 175 splits light in a position corresponding to each lamp 124 of FIG. 8 or an area where light is diffused and diffuses the light into both side areas of the position. The second diffuser plate 175 reduces the quantity of light in the position corresponding to the lamp 124 or the area where light is diffused. From FIG. 9B, it is confirmed that the quantity of light is reduced in the position corresponding to the lamp 124, that is, in the position right over the lamp 124. Light is brighter in the both side areas of the position corresponding to the lamp 124 than in the position corresponding to the lamp 124. Accordingly, when light emitted from on lamp passes through the second diffuser plate 175, the light seems to be emitted from two lamps.

Figure 11A:
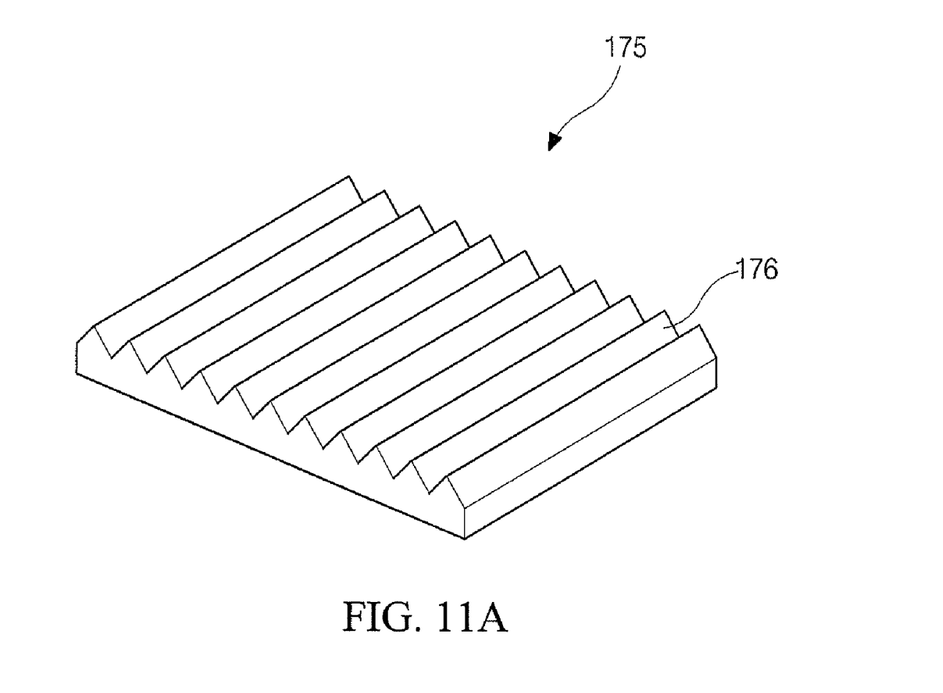
FIGS. 11A to 11C are perspective views illustrating various patterns of a second diffuser plate according to the present invention
Figure 11B:
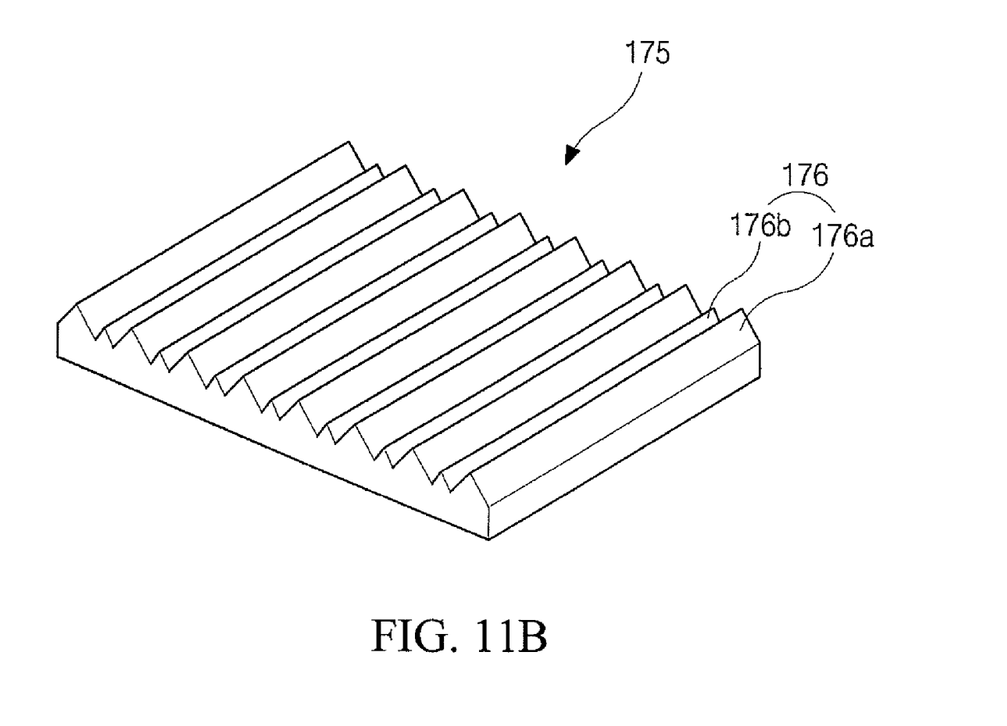
Figure 11C:
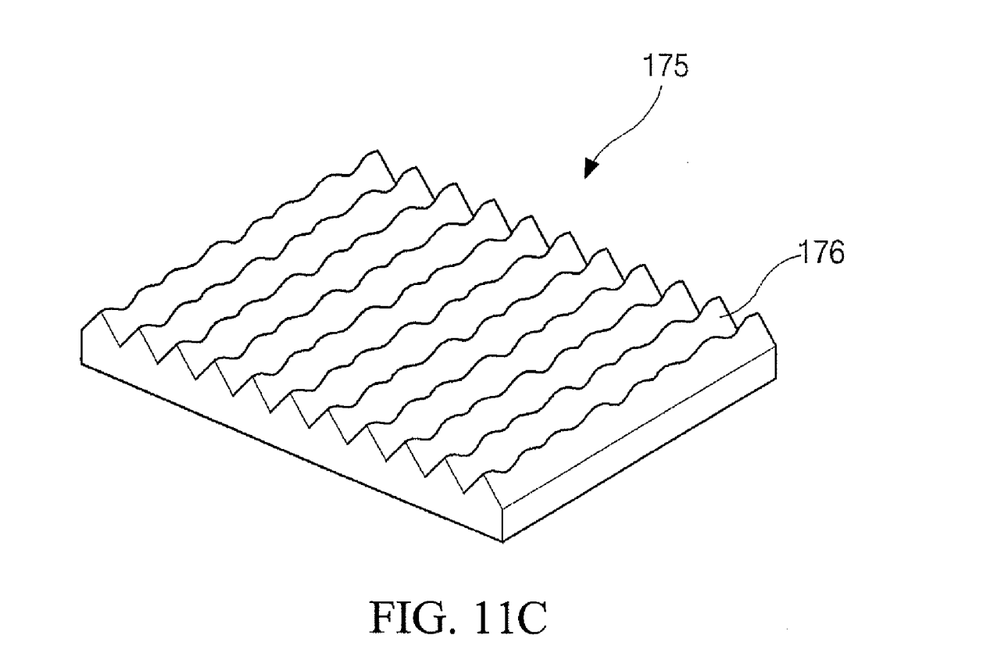

FIGS. 11A to 11C are perspective views illustrating various patterns of a second diffuser plate according to the present invention.

In FIGS. 11A to 11C, the second diffuser plate 175 has a third surface facing the first diffuser plate 175 of FIG. 7 or the lamps 124 of FIG. 7 and a fourth surface opposite to the third surface and facing the liquid crystal panel 110 of FIG. 7. The third surface of the second diffuser plate 175 is flat, and the fourth surface of the second diffuser plate 175 includes uneven second patterns 176. The second patterns 176 each may have a prism shape, which has a cross-section of a triangle, and is disposed parallel to the lamps 124. The second patterns 176 may have a long bar shape extending along the first direction parallel to the lamps 124. The second patterns 176 may have peaks at the same height as shown in FIG. 11A. The second patterns 176 may include first and second parts being adjacent to each other and having peaks at different heights as shown in FIG. 11B. Each of the second patterns 176 may have different heights as shown in FIG. 11C.

The second patterns 176, beneficially, may have a pitch, which is a distance between adjacent peaks, within a range of 50 μm to 500 μm and heights within a range of 20 μm to 400 μm. The second patterns 176 may be arranged with the regular pitch, and the second patterns 176 may be irregularly disposed, that is, randomly disposed with different distances between adjacent two within the range of about 50 μm to about 500 μm.

The second diffuser plate 175 may be formed of one of PMMA (polymethyl methacrylate), PS (polystyrene), PC (polycarbonate), COC (cyclo-olefin copolymers), PET (polyethylene terephthalate), PBT (polybutylene terephtalate) and plastic alloys as the same material as the first diffuser plate 170. It is also desirable that the second diffuser plate 175 including the second patterns 176 has a thickness of about 0.6 mm to about 3 mm.

Figure 12:
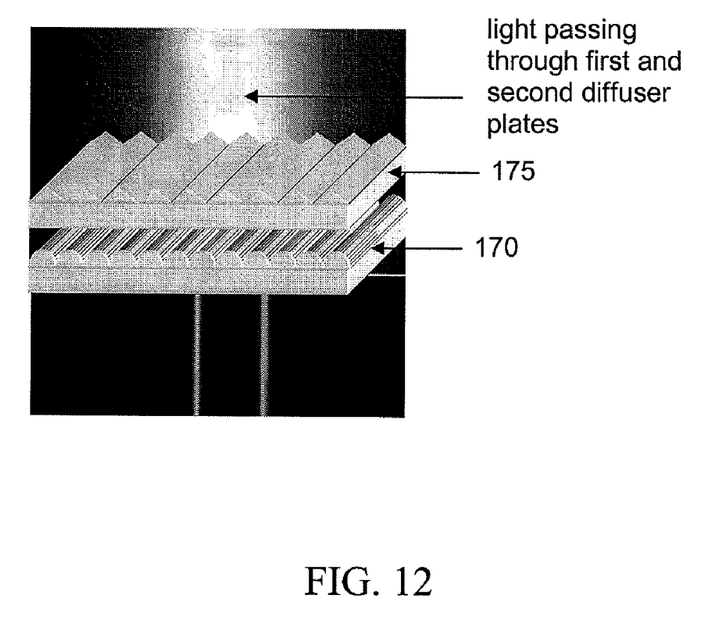
FIG. 12 is a view showing status of lights passing through a first diffuser plate and a second diffuser plate of an LCD module according to the present invention.

FIG. 12 is a view showing status of lights passing through a first diffuser plate and a second diffuser plate of an LCD module according to the present invention.

Referring to FIG. 8 and FIG. 12, in the LCD module according to the present invention, the first diffuser plate 170 diffuses light emitted from one lamp 124 into an area wider than the diameter of the lamp 124, and the second diffuser plate 175 reduces the quantity of light corresponding to the area and splits the light into both sides of the area. Therefore, even though the lamps 124 are disposed with the first distance S, which is more than the first distance of the related art and less than and/or equal to twice the first distance of the related art, the liquid crystal panel 110 of FIG. 7 is provided with lights such that there is almost no brightness difference, that is, the brightness is uniform over a substantially entire area of the liquid crystal panel 110 of FIG. 7.

Here, the ratio of the first distance S between adjacent lamps 124 and the second distance D between the reflection sheet 122 and the first diffuser plate 125, that is, a value of the first distance S over the second distance D, which may be referred to as a distance ratio S/D, may be more than 0 and less than and/or equal to 2.75. Accordingly, even if the distance ratio S/D is within a range of 1.35 to 2.75, there is no mura defect in the LCD module 101 of FIG. 7 due to the brightness difference.

The distance ratio S/D can rise by increasing the first distance S or by decreasing the second distance D. If the first distance S is increased, the distance between adjacent lamps 124 of FIG. 7 increases, and the number of lamps 124 is decreased. Accordingly, the power consumption is decreased, and the manufacturing costs are lowered. Meanwhile, if the second distance D is decreased, the thickness of the backlight unit 120 is decreased, and the LCD module 101 of FIG. 7 gets relatively thin.

Even though the LCD module 101 of FIG. 7 according to the present invention includes the first and second diffuser plates 170 and 175 more than the related art, the first and second diffusers 170 and 175 have the thickness of 3 mm. On the other hand, the second distance between the reflection sheet 122 of FIG. 7 and the first diffuser plate 170 of FIG. 7 can be reduced by a value larger than 3 mm as compared with the related art such that the distance ratio is within the range in which there is no mura defect. Therefore, the LCD module according to the present invention can be thinner than the related art.

Figure 13A:
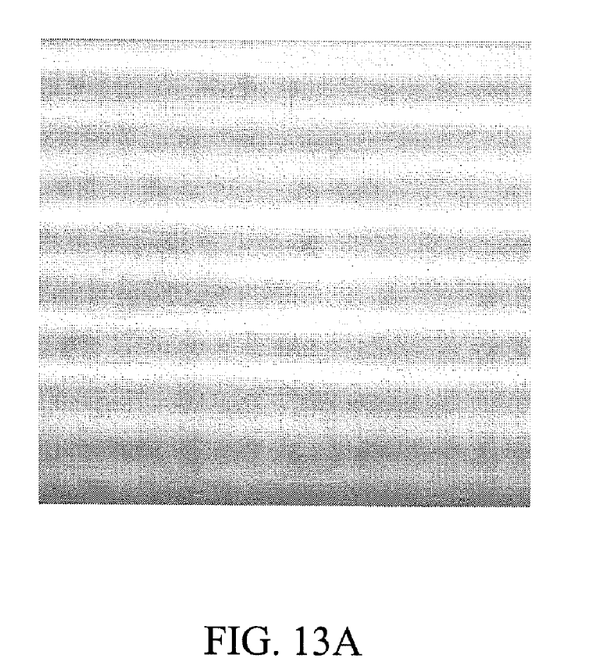
FIG. 13A is a photo showing a white image displayed in an LCD module according to the related art.
Figure 13B:
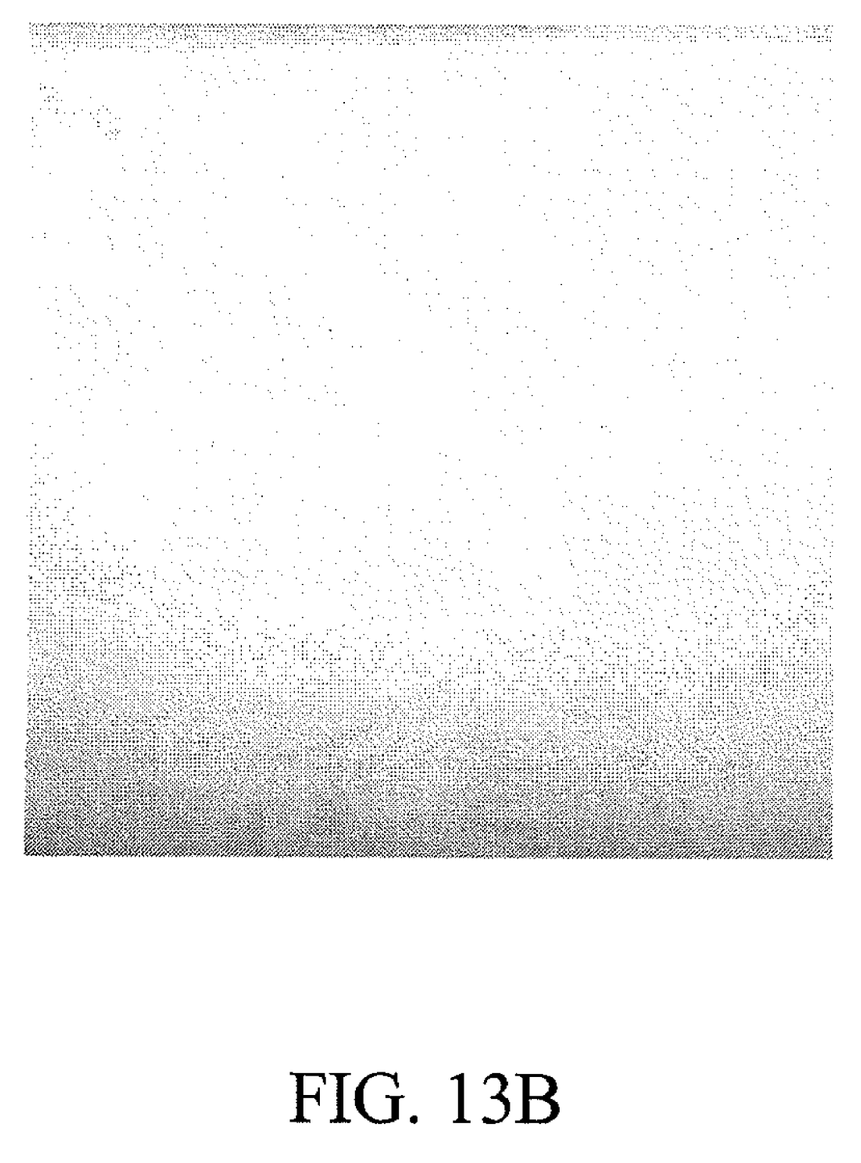
FIG. 13B is a photo showing a white image displayed in an LCD module according to the present invention.

FIG. 13A is a photo showing a white image displayed in an LCD module according to the related art, and FIG. 13B is a photo showing a white image displayed in an LCD module according to the present invention. The LCD modules include lamps that are arranged with the distance ratio S/D of 2.75, wherein the distance from the lamps to the diffuser in the LCD module of the related art is equal to the distance from the lamps to the first diffuser plate in the LCD module of the present invention. For example, the LCD module may be a 42 inch model, in which nine lamps may be arranged. When the distance ratio is 1.35, the 42 inch model includes sixteen lamps.

As shown in FIG. 13A, in the related art LCD module, the lamps are disposed beyond the diffusing ability of the diffuser plate, and there occur mura defects in which bright portions and dark portions of bar shapes are repeatedly shown.

However, as shown in FIG. 13B, in the LCD module of the present invention, the bright and dark portions of bar shapes are not shown, and the white image is displayed with uniform brightness over a substantially entire area.

In the meantime, the first diffuser plate and the second diffuser plate can be replaced with each other, and the same results can be obtained. That is, although the second diffuser plate is disposed to be adjacent to the lamps and the first diffuser plate is disposed over the second plate, there is no mura defect due to the brightness difference.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

The invention claimed is:

1. A backlight unit, comprising:
   a reflection sheet;
   a plurality of lamps arranged over the reflection sheet and with a first distance between adjacent lamps;
   a first diffuser plate disposed over the plurality of lamps and spaced apart from the reflection sheet with a second distance, the first diffuser plate having a first surface facing the reflection sheet and a second surface opposite to the first surface, wherein the first surface is flat and the second surface includes first patterns; and
   a second diffuser plate disposed over the first diffuser plate, the diffuser plate having a third surface facing the first diffuser plate and a fourth surface opposite to the third surface, wherein the third surface is flat and the second surface includes second patterns,
   wherein a ratio of the first distance over the second distance is within a range of more than 1.35 and less than and/or equal to 2.75,
   wherein ones of the first patterns and the second patterns have lenticular lenses, and others of the first patterns and the second patterns have prisms, and wherein each of the prisms has an unevenness at a peak along a first direction parallel to the lamps.

2. The backlight unit according to claim 1, wherein the prisms have a same height.

3. The backlight unit according to claim 1, wherein adjacent prisms have different heights.

4. The backlight unit according to claim 1, wherein each prism has a plurality of heights.

5. The backlight unit according to claim 1, wherein the first patterns and the second patterns have heights of about 20 μm to about 500 μm and pitches of about 50 μm to about 500 μm.

6. The backlight unit according to claim 5, wherein the heights of the first patterns are equal to each other and the heights of the second patterns are equal to each other.

7. The backlight unit according to claim 5, wherein the pitches of the first patterns are equal to each other and the pitches of the second patterns are equal to each other.

8. The backlight unit according to claim 1, wherein the lenticular lenses have a bar shape extending along the first direction parallel to the lamps and have a length corresponding to the lamps.

9. The backlight unit according to claim 1, wherein the lenticular lenses are spaced apart from each other along the first direction parallel to the lamps and along a second direction perpendicular to the lamps.

10. The backlight unit according to claim 1, wherein each of the first and second diffuser plates has a thickness of about 0.6 mm to about 3 mm and includes one of PMMA (polymethyl methacrylate), PS (polystyrene), PC (polycarbonate), COC (cyclo-olefin copolymers), PET (polyethylene terephthalate), PBT (polybutylene terephtalate) and plastic alloys.

11. The backlight unit according to claim 1, further comprising a plurality of optical sheets over the second diffuser plate and support sides supporting respective ends of each lamp.

12. A liquid crystal display device, comprising:
   a backlight unit including:
      a reflection sheet;
      a plurality of lamps arranged over the reflection sheet and with a first distance between adjacent lamps;
      a first diffuser plate disposed over the plurality of lamps and spaced apart from the reflection sheet with a second distance, the first diffuser plate having a first surface facing the reflection sheet and a second surface opposite to the first surface, wherein the first surface is flat and the second surface includes first patterns; and
      a second diffuser plate disposed over the first diffuser plate, the diffuser plate having a third surface facing the first diffuser plate and a fourth surface opposite to the third surface, wherein the third surface is flat and the second surface includes second patterns;
   a liquid crystal panel over the backlight unit;
   a support main under the liquid crystal panel and over the backlight unit; and
   a top case covering edges of an upper surface of the liquid crystal panel and side surfaces of the support main,
   wherein a ratio of the first distance over the second distance is within a range of more than 1.35 and less than and/or equal to 2.75,
   wherein ones of the first patterns and the second patterns have lenticular lenses, and others of the first patterns and the second patterns have prisms, and wherein each of the prisms has an unevenness at a peak along a first direction parallel to the lamps.

13. The device according to claim 12, wherein the first patterns and the second patterns have heights of about 20 μm to about 500 μm and pitches of about 50 μm to about 500 μm.

14. The device according to claim 13, wherein the heights of the first patterns are equal to each other and the heights of the second patterns are equal to each other.

15. The device according to claim 13, wherein the pitches of the first patterns are equal to each other and the pitches of the second patterns are equal to each other.

16. The device according to claim 12, wherein the lenticular lenses have a bar shape extending along the first direction parallel to the lamps and have a length corresponding to the lamps.

17. The device according to claim 12, wherein the lenticular lenses are spaced apart from each other along the first direction parallel to the lamps and along a second direction perpendicular to the lamps.

18. The device according to claim 12, further comprising:
   a cover bottom under the reflection sheet;
   a plurality of optical sheets over the second diffuser plate;
   support sides supporting respective ends of each lamp;
   gate and data printed circuit boards connected to the liquid crystal panel; and
   an inverter unit connected to the lamps and disposed under the cover bottom.

* * * * *